(12) United States Patent
Zhou et al.

(10) Patent No.: US 10,590,675 B2
(45) Date of Patent: Mar. 17, 2020

(54) FOLDABLE VEHICLE ROOF TENT

(71) Applicant: Q-YIELD OUTDOOR GEAR LTD., Xiamen, Fujian (CN)

(72) Inventors: Nanqing Zhou, Xiamen (CN); Muhua Mao, Xiamen (CN); Ming Chen, Xiamen (CN)

(73) Assignee: Q—YIELD OUTDOOR GEAR LTD., Xiamen, Fujian (CN)

( * ) Notice: Subject to any disclaimer, the term of this patent is extended or adjusted under 35 U.S.C. 154(b) by 0 days.

(21) Appl. No.: 16/094,464

(22) PCT Filed: Jun. 29, 2017

(86) PCT No.: PCT/CN2017/090765
§ 371 (c)(1),
(2) Date: Oct. 17, 2018

(87) PCT Pub. No.: WO2018/113238
PCT Pub. Date: Jun. 28, 2018

(65) Prior Publication Data
US 2019/0128009 A1     May 2, 2019

(51) Int. Cl.
*E04H 15/06* (2006.01)
*B60P 3/38* (2006.01)
*E04H 15/48* (2006.01)
*E04H 15/00* (2006.01)
*E04H 15/54* (2006.01)
*E04H 15/08* (2006.01)

(52) U.S. Cl.
CPC ............... *E04H 15/06* (2013.01); *B60P 3/38* (2013.01); *E04H 15/00* (2013.01); *E04H 15/008* (2013.01); *E04H 15/08* (2013.01); *E04H 15/48* (2013.01); *E04H 15/54* (2013.01)

(58) Field of Classification Search
CPC ........... E04H 15/008; E04H 15/06; B60P 3/38
USPC .................................... 135/88.14, 88.16
See application file for complete search history.

(56) References Cited

U.S. PATENT DOCUMENTS

| 3,009,471 | A | * | 11/1961 | Rossiter | .................... | B60P 3/38 |
| | | | | | | 135/88.16 |
| 3,080,575 | A | * | 3/1963 | Johns | ........................ | B60P 3/38 |
| | | | | | | 5/119 |
| 3,228,406 | A | * | 1/1966 | Jamba | ..................... | E04H 15/06 |
| | | | | | | 135/88.14 |
| 3,351,078 | A | * | 11/1967 | Kleiman | ................... | B60P 3/38 |
| | | | | | | 135/148 |

(Continued)

*Primary Examiner* — Noah Chandler Hawk
(74) *Attorney, Agent, or Firm* — Leong C. Lei (57) ABSTRACT

A foldable vehicle roof tent includes a base, a top portion support rack and a middle portion support rack. The middle portion support rack includes a connecting frame, middle supporting rods and top supporting rods. One end of the connecting frame is hingedly connected to a front end of the base, and the other end is hingedly connected to a rear end of the top portion support rack. A rear end middle portion of the base is provided with a connecting base. One end of each of the middle supporting rods is rotatably arranged on the connecting base, and the other ends of the middle supporting rods are symmetrically matched on two sides of the end of the connecting frame connected to the top portion support rack. The top supporting rods are symmetrically arranged on two sides of the connecting frame.

13 Claims, 9 Drawing Sheets

(56) References Cited

U.S. PATENT DOCUMENTS

| | | | | |
|---|---|---|---|---|
| 3,575,460 A * | 4/1971 | Kennedy | ............... | B60P 3/38 |
| | | | | 296/160 |
| 4,366,979 A * | 1/1983 | Pillot | ............... | B60P 3/38 |
| | | | | 135/148 |
| 4,548,438 A * | 10/1985 | Myers | ............... | B60P 3/38 |
| | | | | 135/88.16 |
| 4,657,300 A * | 4/1987 | Penny | ............... | B60P 3/341 |
| | | | | 296/170 |
| 5,544,671 A * | 8/1996 | Phillips | ............... | B60P 3/341 |
| | | | | 135/150 |
| 8,826,928 B2 * | 9/2014 | Zhou | ............... | E04H 15/06 |
| | | | | 135/151 |
| 9,222,278 B2 * | 12/2015 | Park | ............... | E04H 15/06 |
| 10,077,574 B1 * | 9/2018 | Currid | ............... | E04H 15/06 |
| 2008/0308138 A1 * | 12/2008 | Brochier | ............... | B60P 3/341 |
| | | | | 135/88.17 |
| 2016/0138293 A1 * | 5/2016 | Zhou | ............... | E04H 15/02 |
| | | | | 135/88.14 |

\* cited by examiner

FOLDABLE VEHICLE ROOF TENT

BACKGROUND OF THE INVENTION

1. Field of the Invention

The present invention relates to a tent, and more particularly, to a foldable vehicle roof tent.

2. Description of the Prior Art

With a great increase in private cars, driving a car has become a new way to travel. In order to meet the convenience for travel by car, subsidiary products for travel by car are in the ascendant. A roof tent is developed accordingly.

A roof tent is mounted on top of a car roof. When in use, the roof tent is not disposed on the ground like a tent. Thus, it won't be susceptible to the wet and moisture of the ground, so it is more comfortable for use. Roof tents are disclosed as Chinese Utility Model Publication No. CN201531147U published Jul. 21, 2010, Chinese Utility Model Publication No. CN202187605U published Apr. 11, 2012, and Chinese Utility Model Publication No. CN203213695U published Sep. 25, 2013.

China Utility Model Publication No. CN205617898U discloses a Z-shaped roof tent, comprising a base, a top frame, two connecting rods, two first lift mechanisms, two rear supporting rods, and two second lift mechanisms. The connecting rods of this roof tent are arranged at the left and right ends of the base. The bottom and the top frame are connected in a foldable manner through the rear supporting rods in cooperation with the first lift mechanisms and the second lift mechanisms. The structure is complex. The roof tent is large in size and heavy in weight. This connection way will cause the top frame to shake relative to the base when the tent is unfolded. Especially, after the roof tent is combined with a tent cloth, the overall weight is heavier. The entire roof tent is easily deformed due to uneven stress and insufficient support force, which makes the roof tent uneven in folding and poor in sealing and increases wind resistance during driving. In rainy days, rainwater may flow in the roof tent to affect the safety of driving.

SUMMARY OF THE INVENTION

The primary object of the present invention is to provide a foldable vehicle roof tent with high support strength and uniform stress.

In order to achieve the aforesaid object, the solution of the present invention is described below:

A foldable vehicle roof tent comprises a base, a top portion support rack, and a middle portion support rack. The middle portion support rack includes a connecting frame, at least two middle supporting rods, and at least two top supporting rods. A first end of the connecting frame is pivotally connected to a front end of the base. A second end of the connecting frame is pivotally connected to a rear end of the top portion support rack. First ends of the middle supporting rods are rotatably disposed on a middle portion of a rear end of the base. Second ends of the middle supporting rods are symmetrically connected to two sides of the second end of the connecting frame connected to the top portion support rack. The top supporting rods are symmetrically disposed at two sides of the connecting frame. First ends of the top supporting rods are connected to the connecting frame, respectively. Second ends of the top supporting rods are connected to the top portion support rack, respectively.

Preferably, the middle portion of the rear end of the base is provided with a connecting base. The middle supporting rods are rotatably disposed on the connecting base.

Preferably, two sides of the top portion support rack are symmetrically provided with at least two linking rods. The first ends of the top supporting rods are connected to side surfaces of the connecting frame, respectively. The second ends of the top supporting rods are connected to the linking rods, respectively.

Preferably, a bottom of the base is provided with a plurality of support mounting rods. One of the support mounting rods is disposed at a bottom of the connecting base. The other support mounting rods are symmetrically disposed at two sides of the connecting base.

Preferably, the top portion support rack is a plastic upper cover. The linking rods are disposed on an inner wall of the plastic upper cover. The base is a plastic lower cover. The support mounting rods are disposed on an underside of the plastic lower cover. The connecting base is disposed in the plastic lower cover.

Preferably, each of the top portion support rack and the base is a frame. The linking rods are disposed in the frame of the top portion support rack. The support mounting rods are disposed in the frame of the base.

Preferably, the top portion support rack includes a plastic upper cover and a frame fitted inside the plastic upper cover. The base includes a plastic lower cover and a frame fitted inside the plastic lower cover.

Preferably, each linking rod of the top portion support rack and the connecting base of the base are respectively connected to the top portion support rack and the base through an L-shaped connecting member. The connecting frame and the front end of the base are pivotally connected together through a hinge. The connecting frame and the rear end of the top portion support rack are pivotally connected together through a hinge. The hinge is fixed on the L-shaped connecting member.

Preferably, the rear end of the top portion support rack and a front end of the middle portion support rack are in movable locking engagement with the base.

Preferably, the rear end of the top portion support rack is provided with a locking bar. The base or a rear end of the middle portion support rack is provided with a locking buckle corresponding to the locking bar. A front end of the top portion support rack or a front end of the middle portion support rack is provided with a locking bar. The front end of the base is provided with a locking buckle corresponding to the locking bar.

Preferably, the middle supporting rods and the top supporting rods are any one of elastic telescopic rods, telescopic rods or gas springs driven by a motor.

Preferably, the connecting frame of the middle portion support rack corresponds in size to the base. Two inner side walls of the connecting frame are provided with connecting blocks for connecting the top supporting rods, respectively.

With the above solution, the middle portion support rack and the top portion support rack of the present invention are in cooperation with the middle supporting rods connected between the base and the connecting frame of the middle portion support rack as well as the top supporting rods connected between the top portion support rack and the connecting frame to realize the function of folding and unfolding the roof tent. The structure of the entire roof tent is simple. It is easy to fold and unfold the roof tent. The cost is relatively low, having market competitiveness. In particular, the middle supporting rods of the present invention are connected between the connecting base at the middle portion of the base and the two sides of the second end of the connecting frame connected to the top portion support rack. In this way, a stable triangle support is formed between the connecting frame and the base, so that the top portion support rack and the middle portion support rack are evenly stressed. The support strength of the connecting frame of the middle portion support rack is greatly increased, so that the top portion support rack and the connecting frame are less prone to shake relative to the base. The folded roof tent will not leak air and will not affect the driving safety, and it can maximize the internal space of the roof tent.

DETAILED DESCRIPTION OF THE PREFERRED EMBODIMENTS

Embodiments of the present invention will now be described, by way of example only, with reference to the accompanying drawings.

It should be noted that the terms "front", "rear", and the like indicate that the orientation or positional relationship is based on the orientation or positional relationship shown in the drawings. It is merely for convenience and simplification of the description of the present invention, and does not indicate or imply that the designated device or element must have a particular orientation, be constructed and operated in a specific orientation, and therefore should not be construed to limit the present invention.

As shown in FIGS. 1 to 9, the present invention discloses a foldable vehicle roof tent comprising a base 1, a top portion support rack 2, and a middle portion support rack 3. The middle portion support rack 3 includes a connecting frame 31, at least two middle supporting rods 32, and at least two top supporting rods 33. A first end of the connecting frame 31 is pivotally connected to a front end of the base 1, and a second end of the connecting frame 31 is pivotally connected to a rear end of the top portion support rack 2. First ends of the middle supporting rods 32 are rotatably disposed on a middle portion of a rear end of the base 1. Second ends of the middle supporting rods 32 are symmetrically connected to two sides of the second end of the connecting frame 31 connected to the top portion support rack 2. The top supporting rods 33 are symmetrically disposed at two sides of the connecting frame 31. First ends of the top supporting rods 33 are connected to the connecting frame 31, respectively. Second ends of the top supporting rods 33 are connected to the top portion support rack 2, respectively.

Preferably, the middle portion of the rear end of the base 1 is provided with a connecting base 4. The middle supporting rods 32 are rotatably disposed on the connecting base 4. The connecting base 4 may be made of metal, so as to ensure the connection strength of the middle supporting rod 32. Preferably, two sides of the top portion support rack 2 are symmetrically provided with at least two linking rods 21. The first ends of the top supporting rods 33 are connected to the side surfaces of the connecting frame 31, respectively. The second ends of the top supporting rods 33 are connected to the linking rods 21, respectively. The bottom of the base 1 is provided with a plurality of support mounting rods 11. Wherein, one of the support mounting rods 11 is disposed at the bottom of the connecting base 4, and the other support mounting rods 11 are symmetrically disposed at two sides of the connecting base 4.

FIGS. 1 to 5 illustrate a first embodiment of the foldable vehicle roof tent according to the present invention. This embodiment is a preferred embodiment of the present invention. The connecting frame 31 of the middle portion support rack 3 corresponds in size to the base 1. The top portion support rack 2 may include a plastic upper cover and a frame fitted inside the plastic upper cover. The top portion support rack 2 may be a plastic upper cover, and the linking rods 21 are disposed on an inner wall of the plastic upper cover. The base 1 may include a plastic lower cover and a frame fitted inside the plastic lower cover. The base 1 may be a plastic lower cover, and the support mounting rods 11 are disposed on an underside of the plastic lower cover. The connecting base 4 is disposed in the plastic lower cover. The roof tent in accordance with the present invention can be installed on the fixing rods A on the top of a car through the support mounting rods 11 at the bottom of the plastic lower cover. Each linking rod 21 of the top portion support rack 2 and the connecting base 4 of the base 1 are respectively connected to the top portion support rack 2 and the base 1 through an L-shaped connecting member 5. The connecting frame 31 and the front end of the base 1 are pivotally connected together through a hinge 6. The connecting frame 31 and the rear end of the top portion support rack 2 are also pivotally connected together through a hinge 6. The hinge 6 is fixed on the L-shaped connecting member 5.

The middle supporting rods 32 and the top supporting rods 33 are elastic telescopic rods. They may be telescopic rods or gas springs driven by a motor. The top portion support rack 2 is provided with a locking bar 22. The base 1 is provided with a locking buckle 12 corresponding to the locking bar 22. The locking buckle 12 may be disposed on the connecting frame 31 of the middle portion support rack 3. In addition, the front end of the top portion support rack 2 or the front end of the connecting frame 31 of the middle portion support rack 3 may be provided with a locking bar 22. The front end of the base 1 is provided with a locking buckle 12 corresponding to the locking bar 22.

The first ends of the top supporting rods 33 are connected to the inner side wall of the connecting frame 31 through a connecting block 7, close to the rear end of the connecting frame 31. The second ends of the top supporting rods 33 are connected to the linking rods 21 of the top portion support rack 2, close to the front end of the top portion support rack 2, such that the top supporting rods 33 are inclined to support the top portion support rack 2. The rear end of the top portion support rack 2 is pivotally connected to the rear end of the connecting frame 31 to form a stable triangular support through the middle supporting rods 32.

Figure 5:
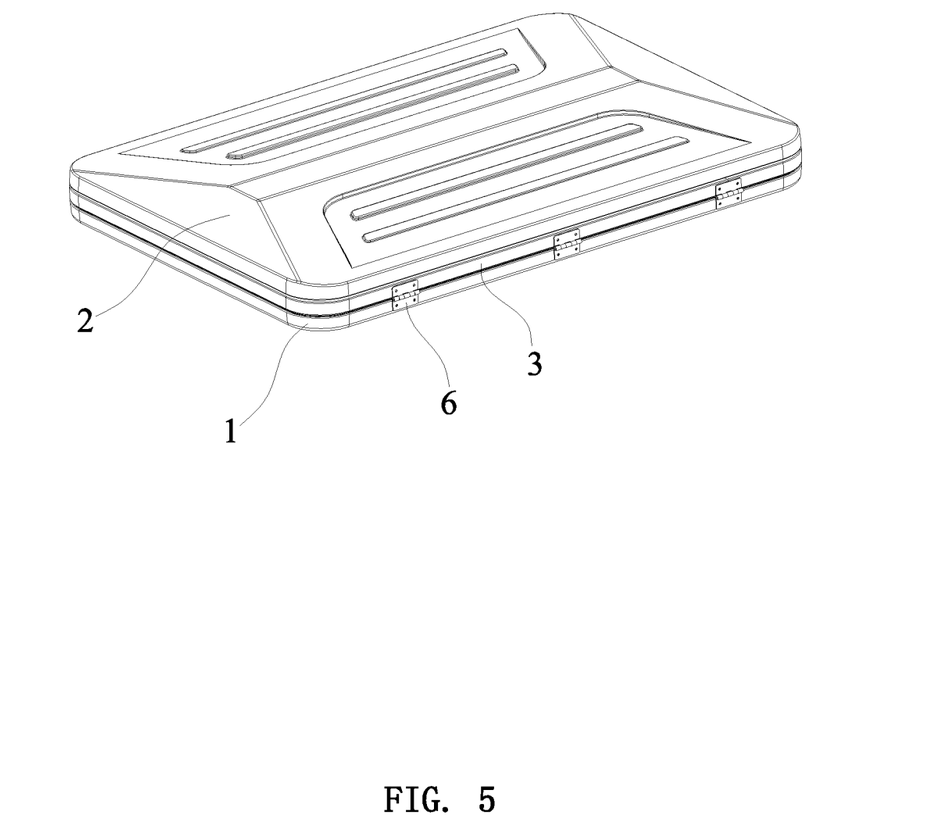
FIG. 5 is a schematic view in accordance with the first embodiment of the present invention in a folded state.

As shown in FIG. 5, when the roof tent is in a folded state, the connecting frame 31, the top supporting rods 33 and the top portion support rack 2 are folded and stacked on the base 1 in sequence. The middle supporting rods 32 are folded to abut against the two sides of the connecting base 4. The locking bar 22 on the top portion support rack 2 or the connecting frame 31 is locked to the locking buckle 12 on the base 1. At this time, the top supporting rods 33 and the middle supporting rods 32 are in a compression and energy storage state.

Figure 1:
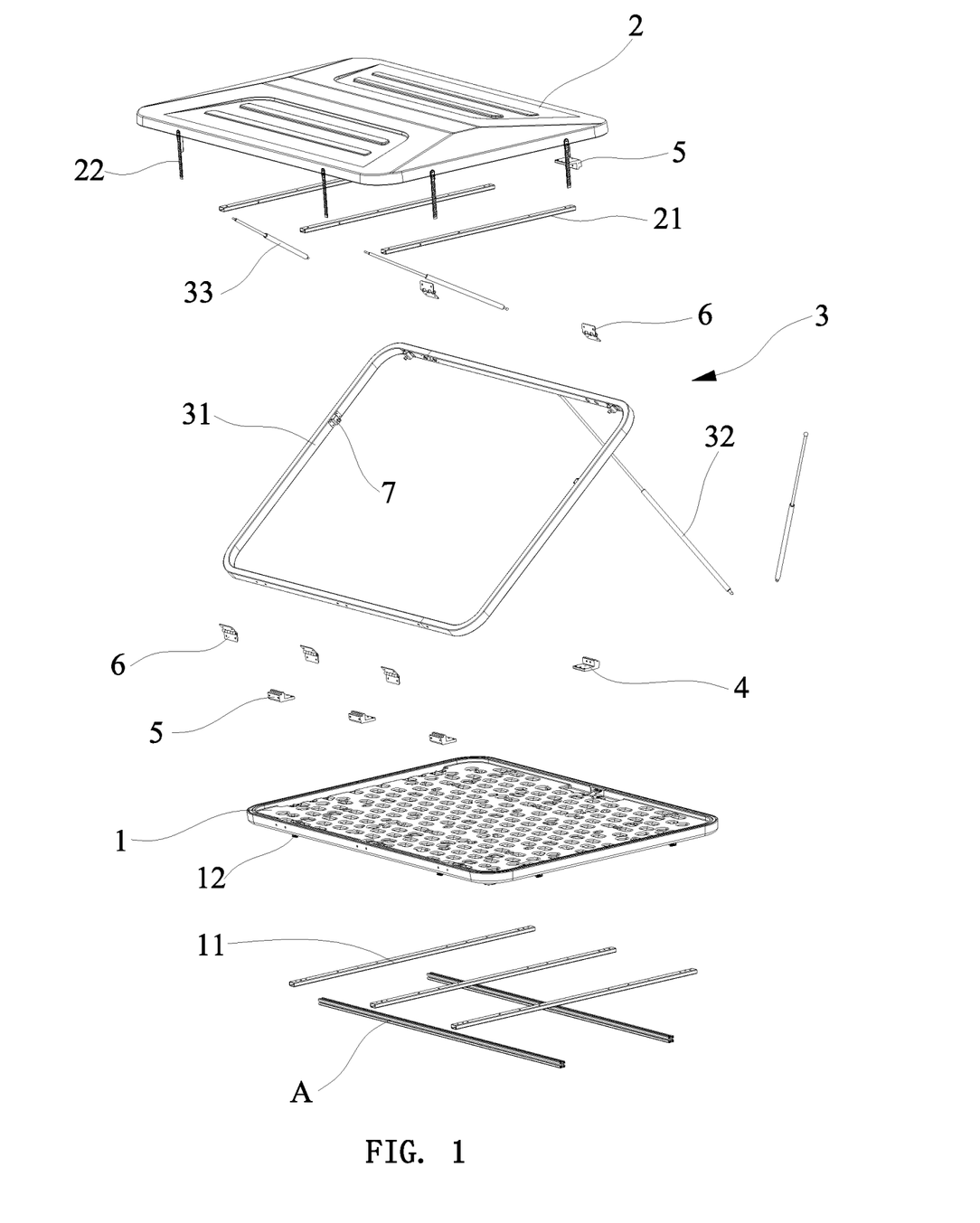
FIG. 1 is a first exploded view in accordance with a first embodiment of the present invention.
Figure 2:
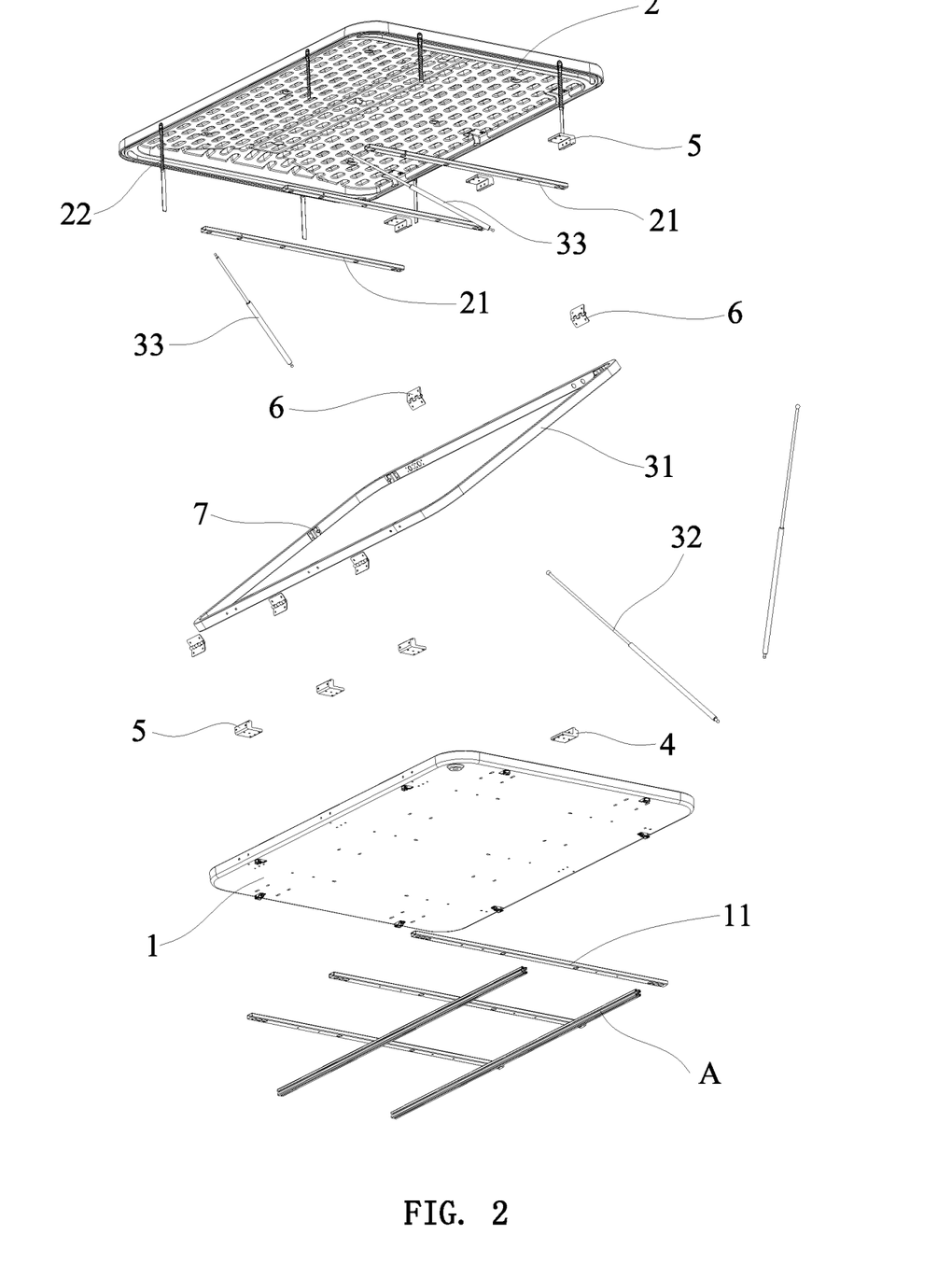
FIG. 2 is a second exploded view in accordance with the first embodiment of the present invention.
Figure 3:
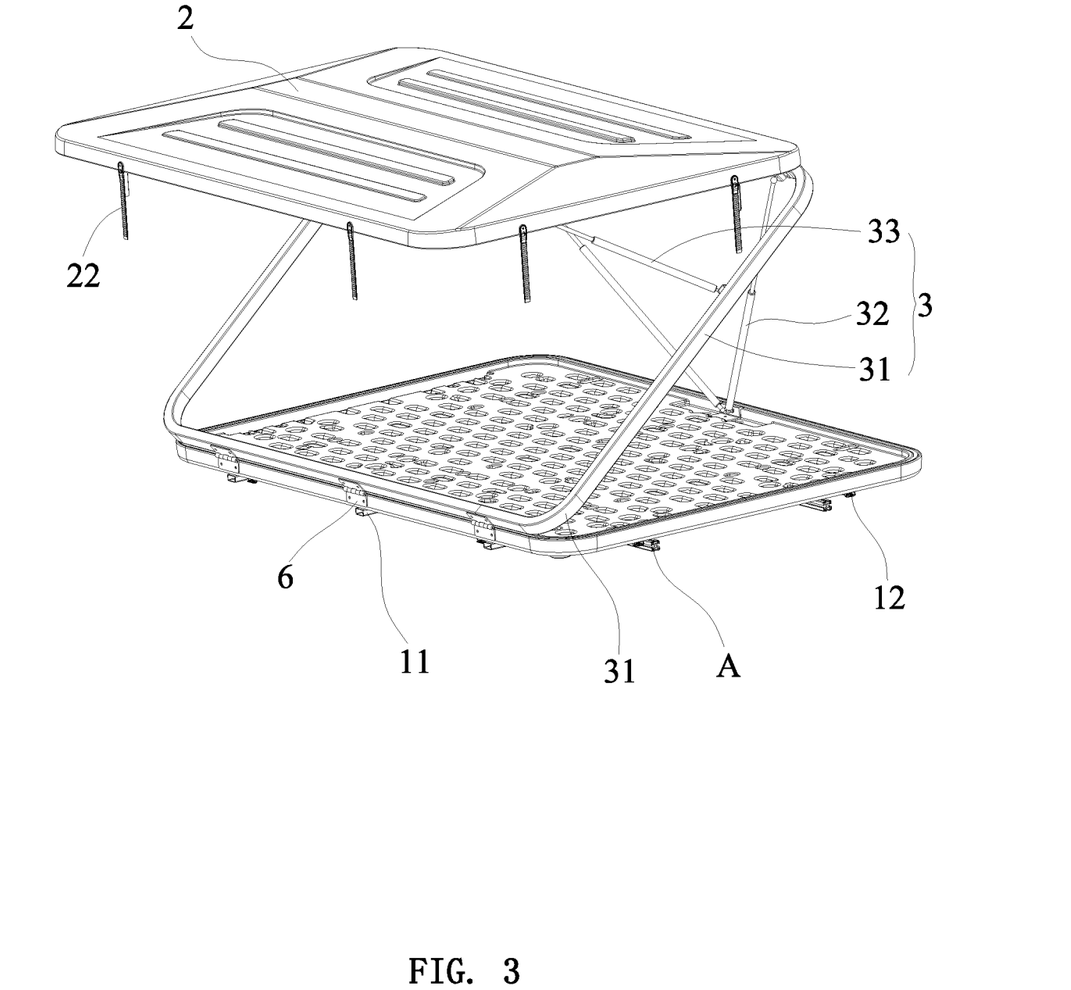
FIG. 3 is a first schematic view in accordance with the first embodiment of the present invention in an unfolded state.
Figure 4:
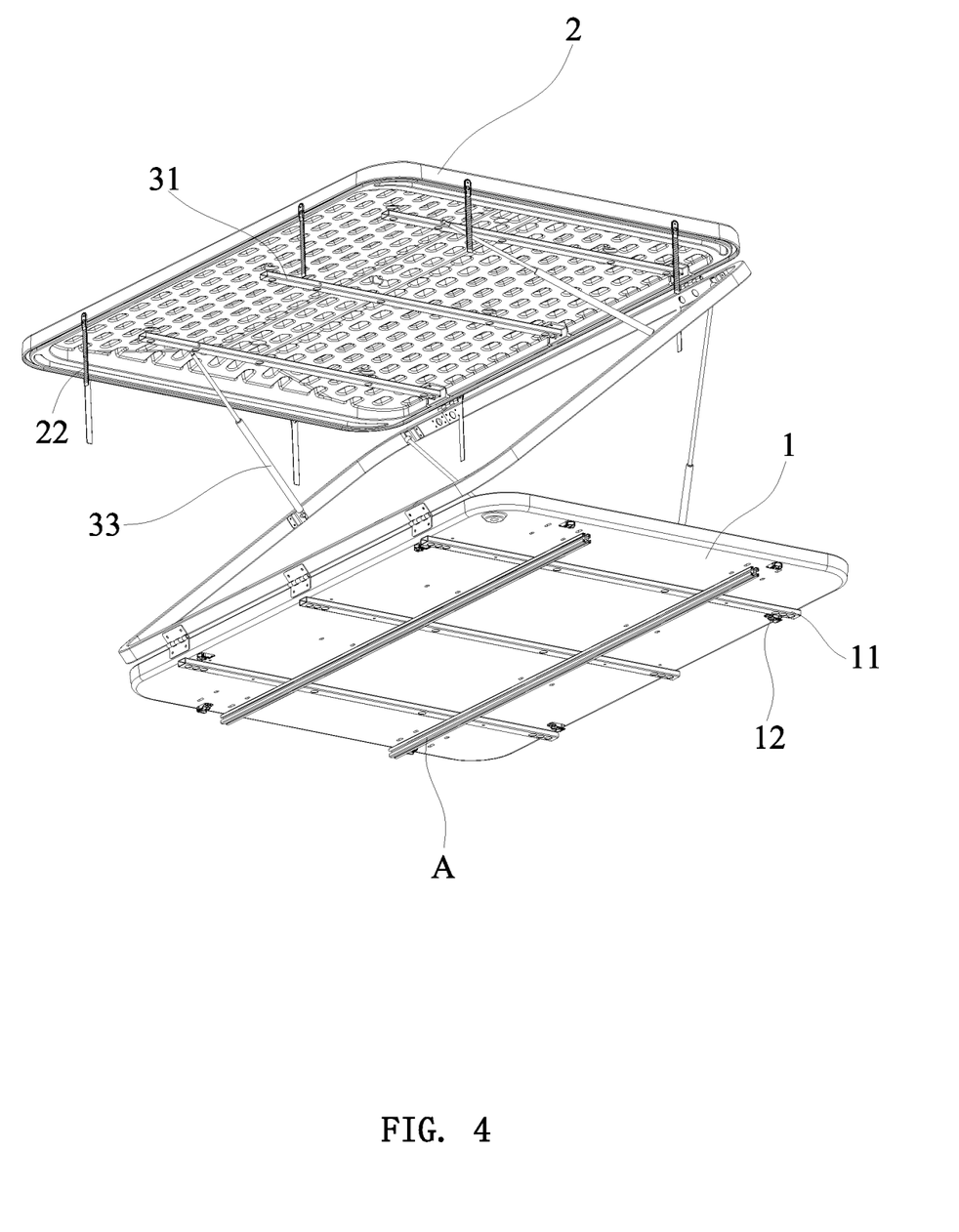
FIG. 4 is a second schematic view in accordance with the first embodiment of the present invention in an unfolded state.

As shown in FIG. 3 and FIG. 4, when the roof tent needs to be unfolded, the locking relationship between the locking bar 22 and the locking buckle 12 is released. One end of the top portion support rack 2 is pulled or lifted upward to disengage one end of the top portion support rack 2 from the base 1. Then, the other end of the top portion support rack 2 is pulled or lifted, and the connecting frame 31 connected with the rear end of the top portion support rack 2 is lifted together. The middle supporting rods 32 and the top supporting rods 33 of the middle portion support rack 3 release the compression energy. The connecting frame 31 and the rear end of the top portion support rack 2 are lifted while the middle supporting rods 32 are extended, so as to unfold the entire roof tent. The foregoing actions can be operated reversely.

When the roof tent is folded, the top portion support rack 2 and the connecting frame 31 can be folded toward the base 1 by pulling the locking bar 22 or pressing the top portion support rack 2 toward the base 1 to fold the top supporting rods 33 and the middle supporting rods 32. In this way, the semi-automatic operation of the roof tent is realized.

The folding operation of the roof tent is not limited to the movable locking relationship between the locking bar and the locking buckle. The movable locking relationship can be realized by using a structure such as a movable hook or the like. That is, the rear end of the top portion support rack 2 and the front end of the connecting frame 31 are movably buckled and engaged with the base 1.

Figure 6:
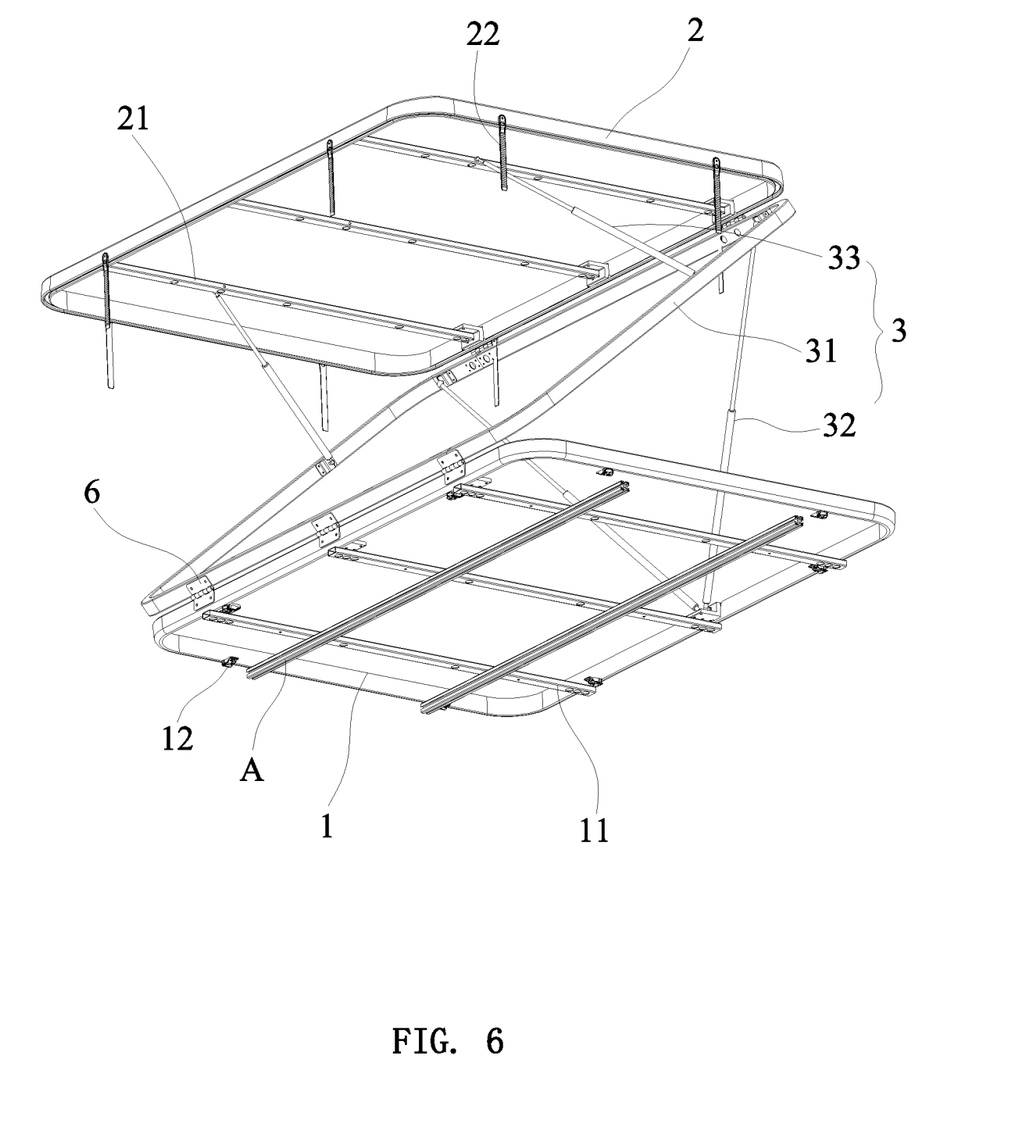
FIG. 6 is a first schematic view in accordance with a second embodiment of the present invention in an unfolded state.
Figure 7:
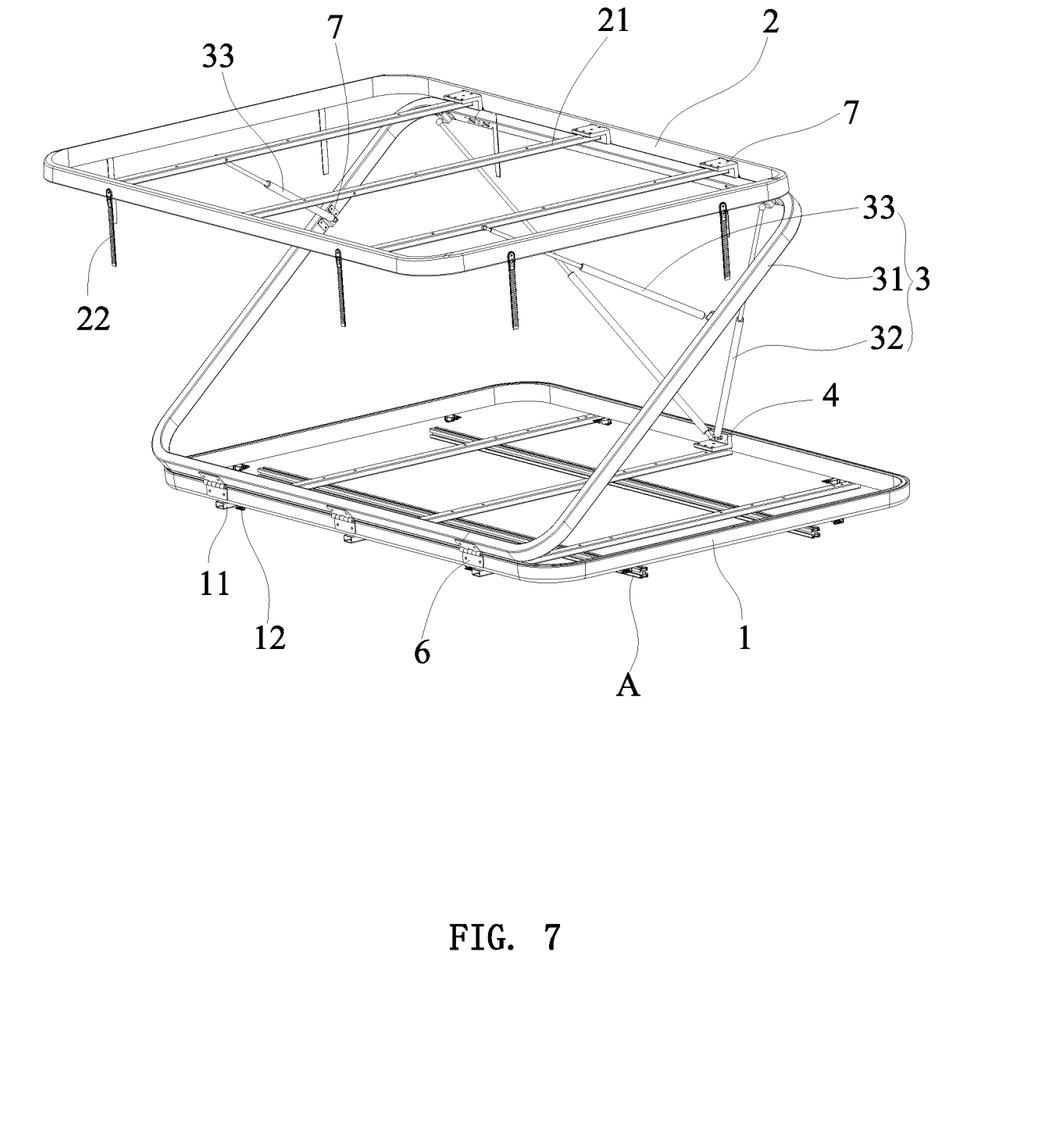
FIG. 7 is a second schematic view in accordance with the second embodiment of the present invention in an unfolded state.

FIG. 6 and FIG. 7 illustrate a second embodiment of the foldable vehicle roof tent according to the present invention. The difference between the second embodiment and the first embodiment is that: each of the top portion support rack 2 and the base 1 is a frame. The frames cooperate with a tent cloth (not shown in the figures). The linking rods 21 are disposed in the frame of the top portion support rack 2. The support mounting rods 11 are disposed in the frame of the base 1.

Figure 8:
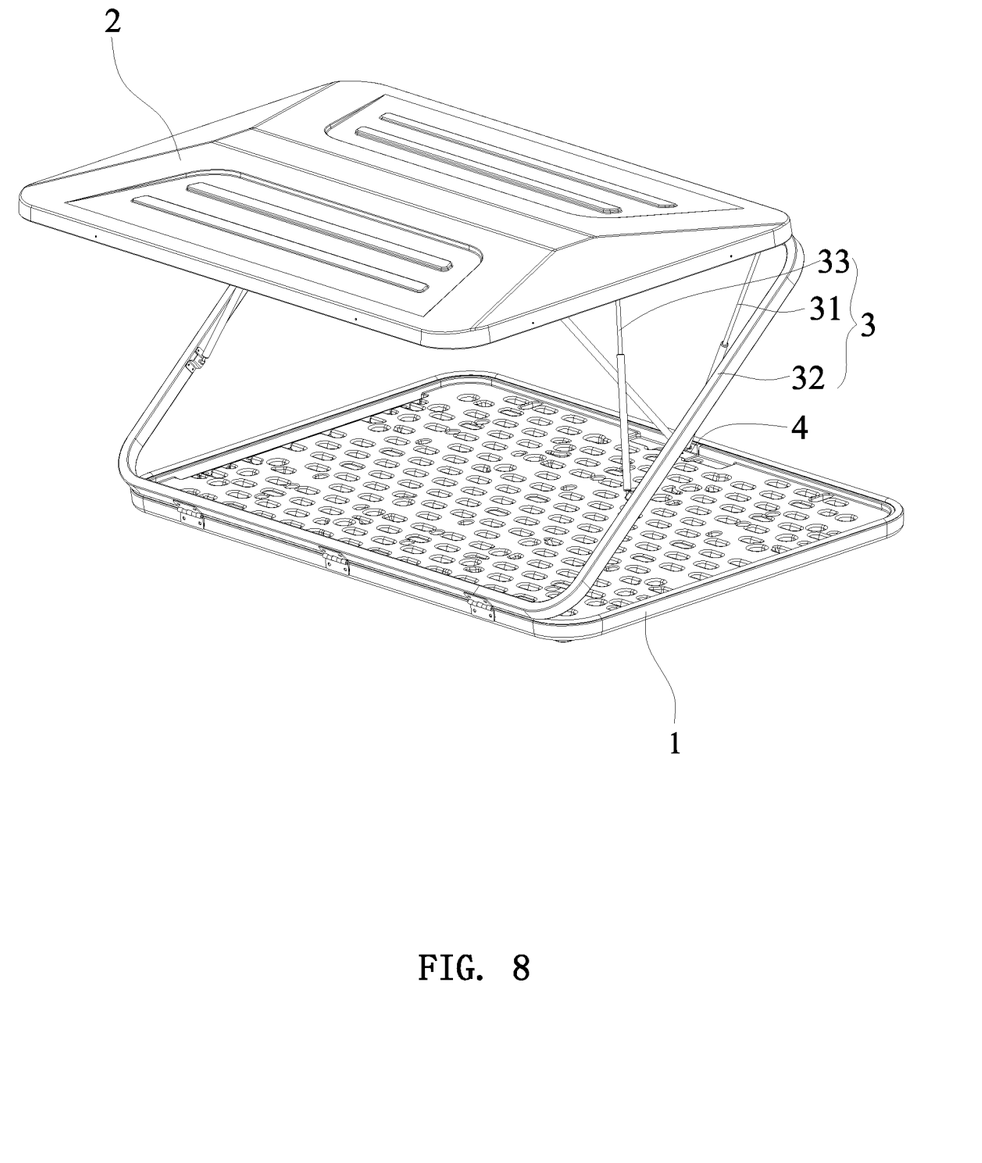
FIG. 8 is a schematic view in accordance with a third embodiment of the present invention in an unfolded state.

FIG. 8 illustrates a third embodiment of the foldable vehicle roof tent according to the present invention. The third embodiment is based on the first embodiment, comprising a base 1, a top portion support rack 2, and a middle portion support rack 3. The middle portion support rack 3 includes a connecting frame 31, at least two middle supporting rods 32, and at least two top supporting rods 33. A first end of the connecting frame 31 is pivotally connected to a front end of the base 1, and a second end of the connecting frame 31 is pivotally connected to a rear end of the top portion support rack 2. The middle portion of the rear end of the base 1 is provided with a connecting base 4. First ends of the middle supporting rods 32 are rotatably disposed on the connecting base 4. Second ends of the middle supporting rods 32 are symmetrically connected to two sides of the second end of the connecting frame 31 connected to the top portion support rack 2. The top supporting rods 33 are symmetrically disposed at two sides of the connecting frame 31. First ends of the top supporting rods 33 are connected to the connecting frame 31, respectively. Second ends of the top supporting rods 33 are connected to the top portion support rack 2, respectively. Wherein, the top portion support rack 2 is a plastic upper cover, and the base 1 is a plastic lower cover.

Figure 9:
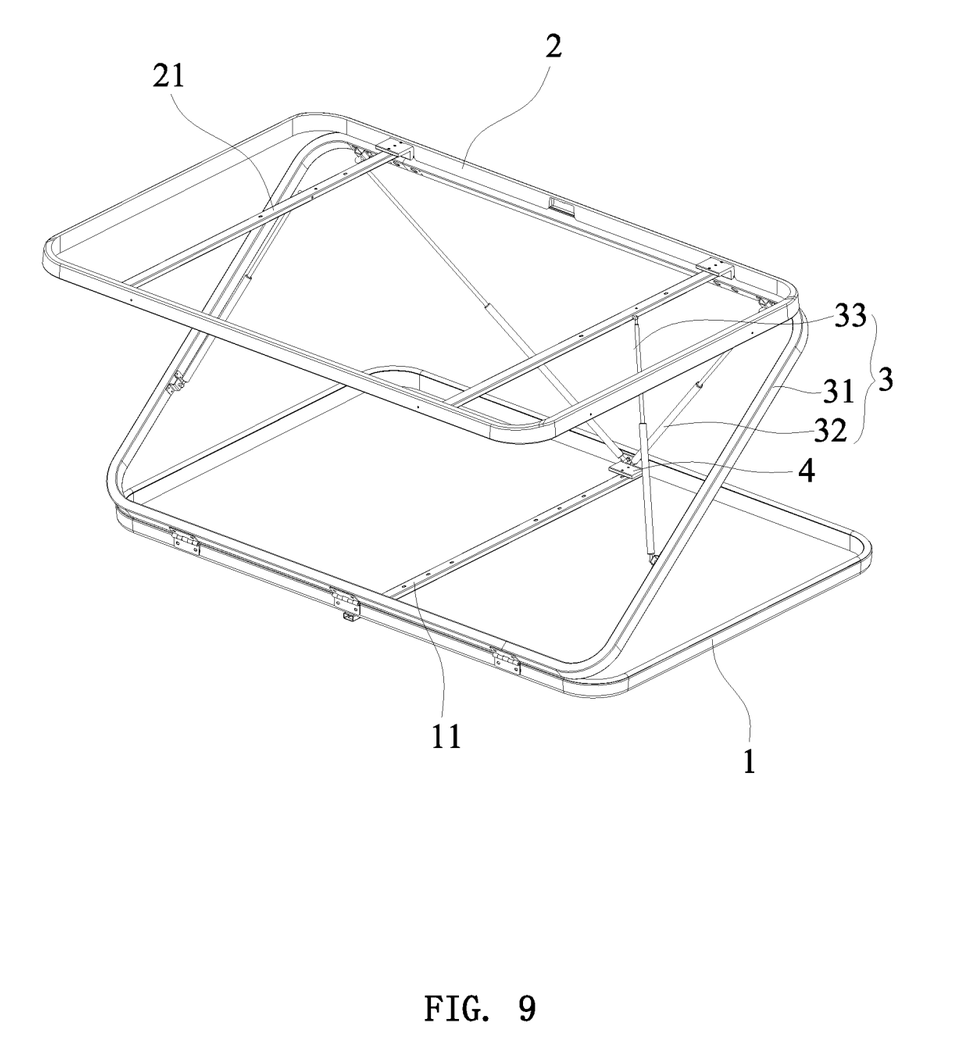
FIG. 9 is a schematic view in accordance with a fourth embodiment of the present invention in an unfolded state.

FIG. 9 illustrates a fourth embodiment of the foldable vehicle roof tent according to the present invention. The fourth embodiment is based on the second embodiment, comprising a base 1, a top portion support rack 2, and a middle portion support rack 3. The middle portion support rack 3 includes a connecting frame 31, at least two middle supporting rods 32, and at least two top supporting rods 33. A first end of the connecting frame 31 is pivotally connected to a front end of the base 1, and a second end of the connecting frame 31 is pivotally connected to a rear end of the top portion support rack 2. The middle portion of the rear end of the base 1 is provided with a connecting base 4. First ends of the middle supporting rods 32 are rotatably disposed on the connecting base 4. Second ends of the middle supporting rods 32 are symmetrically connected to two sides of the second end of the connecting frame 31 connected to the top portion support rack 2. The top supporting rods 33 are symmetrically disposed at two sides of the connecting frame 31. First ends of the top supporting rods 33 are connected to the connecting frame 31, respectively. Second ends of the top supporting rods 33 are connected to the top portion support rack 2, respectively. Wherein, the top portion support rack 2 is a frame, and the base 1 is a frame. The frames cooperate with a tent cloth (not shown in the figures).

To sum up, the present invention is provided with the middle portion support rack 3 and the top portion support rack 2 in cooperation with the middle supporting rods 32 connected between the base 1 and the connecting frame 31 of the middle portion support rack 3 as well as the top supporting rods 33 connected between the top portion support rack 2 and the connecting frame 31 to realize the function of folding and unfolding the roof tent. The structure of the entire roof tent is simple. It is easy to fold and unfold the roof tent. The cost is relatively low, having market competitiveness. In particular, the middle supporting rods 32 of the present invention are connected between the connecting base 4 at the middle portion of the base 1 and the two sides of the second end of the connecting frame 31 connected to the top portion support rack 2. In this way, a stable triangle support is formed between the connecting frame 31 and the base 1, so that the top portion support rack 2 and the middle portion support rack 3 are evenly stressed. The support strength of the connecting frame 31 of the middle portion support rack 3 is greatly increased, so that the top portion support rack 2 and the connecting frame 31 are less prone to shake relative to the base 1. The folded roof tent will not leak air and will not affect the driving safety, and it can maximize the internal space of the roof tent.

The above description is merely preferred embodiments of the present invention, and does not impose any limitation on the technical scope of the present invention. For example, the folding diagram of the roof tent is illustrated by a manual structure. The roof tent may be provided with an automatic lifting mechanism for folding and unfolding the roof tent automatically. Therefore, various modifications and enhancements may be made without departing from the spirit and scope of the present invention. Accordingly, the present invention is not to be limited except as by the appended claims.

What is claimed is:

1. A foldable vehicle roof tent, comprising a base, a top portion support rack and a middle portion support rack; the middle portion support rack including a connecting frame, at least two middle supporting rods and at least two top supporting rods; a first end of the connecting frame being pivotally connected to a front end of the base, a second end of the connecting frame being pivotally connected to a rear end of the top portion support rack; first ends of the middle supporting rods being rotatably disposed on a middle portion of a rear end of the base, second ends of the middle supporting rods being symmetrically connected to two sides of the second end of the connecting frame connected to the top portion support rack so as to define a triangular support between connecting frame and the base; the top supporting rods being symmetrically disposed at two sides of the connecting frame, first ends of the top supporting rods being connected to the connecting frame respectively, second ends of the top supporting rods being connected to the top portion support rack respectively; wherein two sides of the top portion support rack are symmetrically provided with at least two linking rods, the first ends of the top supporting rods are connected to side surfaces of the connecting frame respectively, and the second ends of the top supporting rods are connected to the linking rods respectively.

2. The foldable vehicle roof tent as claimed in claim 1, wherein the middle portion of the rear end of the base is provided with a connecting base, and the middle supporting rods are rotatably disposed on the connecting base.

3. The foldable vehicle roof tent as claimed in claim 1, wherein a bottom of the base is provided with a plurality of support mounting rods, one of the support mounting rods is disposed at a bottom of the connecting base, and the other support mounting rods are symmetrically disposed at two sides of the connecting base.

4. The foldable vehicle roof tent as claimed in claim 3, wherein the top portion support rack is a plastic upper cover, the linking rods are disposed on an inner wall of the plastic upper cover, the base is a plastic lower cover, the support mounting rods are disposed on an underside of the plastic lower cover, and the connecting base is disposed in the plastic lower cover.

5. The foldable vehicle roof tent as claimed in claim 4, wherein each of the linking rods of the top portion support rack and the connecting base of the base are respectively connected to the top portion support rack and the base through an L-shaped connecting member, the connecting frame and the front end of the base are pivotally connected together through a hinge, the connecting frame and the rear end of the top portion support rack are pivotally connected together through another hinge, and the hinge is fixed on the L-shaped connecting member.

6. The foldable vehicle roof tent as claimed in claim 3, wherein each of the top portion support rack and the base is a frame, the linking rods are disposed in the frame of the top portion support rack, and the support mounting rods are disposed in the frame of the base.

7. The foldable vehicle roof tent as claimed in claim 6, wherein each of the linking rods of the top portion support rack and the connecting base of the base are respectively connected to the top portion support rack and the base through an L-shaped connecting member, the connecting frame and the front end of the base are pivotally connected together through a hinge, the connecting frame and the rear end of the top portion support rack are pivotally connected together through another hinge, and the hinge is fixed on the L-shaped connecting member.

8. The foldable vehicle roof tent as claimed in claim 3, wherein the top portion support rack includes a plastic upper cover and a frame fitted inside the plastic upper cover, and the base includes a plastic lower cover and a frame fitted inside the plastic lower cover.

9. The foldable vehicle roof tent as claimed in claim 8, wherein each of the linking rods of the top portion support rack and the connecting base of the base are respectively connected to the top portion support rack and the base through an L-shaped connecting member, the connecting frame and the front end of the base are pivotally connected together through a hinge, the connecting frame and the rear end of the top portion support rack are pivotally connected together through another hinge, and the hinge is fixed on the L-shaped connecting member.

10. The foldable vehicle roof tent as claimed in claim 1, wherein the rear end of the top portion support rack and a front end of the middle portion support rack are in movable locking engagement with the base.

11. The foldable vehicle roof tent as claimed in claim 10, wherein the rear end of the top portion support rack is provided with a locking bar, the base or a rear end of the middle portion support rack is provided with a locking buckle corresponding to the locking bar, a front end of the top portion support rack or a front end of the middle portion support rack is provided with a locking bar, and the front end of the base is provided with a locking buckle corresponding to the locking bar.

12. The foldable vehicle roof tent as claimed in claim 1, wherein the middle supporting rods and the top supporting rods are any one of elastic telescopic rods, telescopic rods or gas springs driven by a motor.

13. The foldable vehicle roof tent as claimed in claim 1, wherein the connecting frame of the middle portion support rack corresponds in size to the base, and two inner side walls of the connecting frame are provided with connecting blocks for connecting the top supporting rods, respectively.

* * * * *